Figure 1:
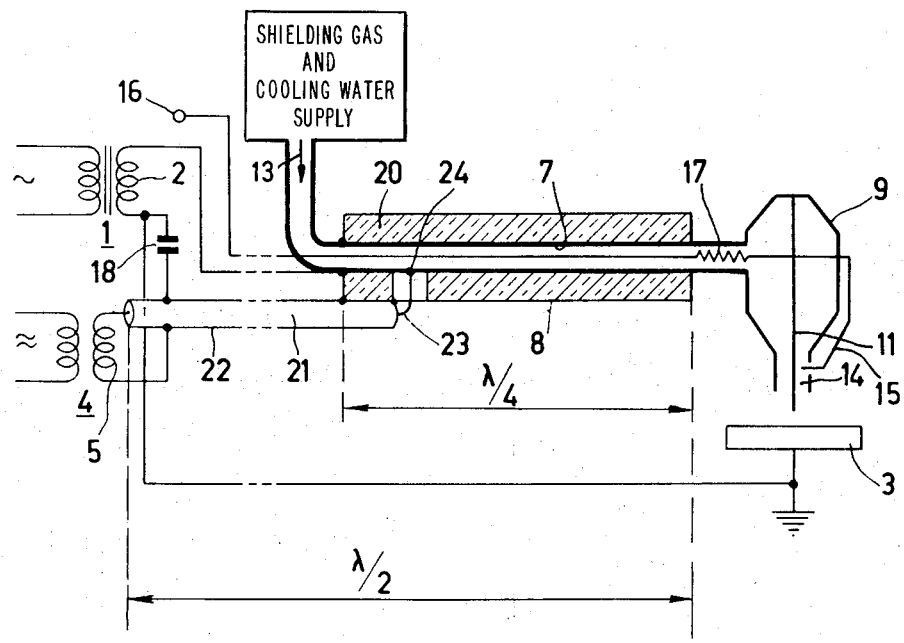

United States Patent
Nahuijsen et al.

[15] 3,694,619
[45] Sept. 26, 1972

[54] GAS-SHIELDED ARC-WELDING SYSTEM

[72] Inventors: Bertus Leendert Nahuijsen; Johan Machiel Schmidt, both of Emmasingel, Eindhoven, Netherlands

[22] Filed: Feb. 3, 1970

[21] Appl. No.: 8,288

[30] Foreign Application Priority Data

Feb. 3, 1969 Netherlands..............6901721

[52] U.S. Cl. ...................219/130, 219/75, 219/131, 219/135
[51] Int. Cl. .............................................B23k 9/00
[58] Field of Search..........219/131, 130, 135, 75, 74; 315/170, 171

[56] References Cited

UNITED STATES PATENTS

| | | | |
|---|---|---|---|
| 1,929,878 | 10/1933 | Clavier | 333/35 |
| 2,708,719 | 5/1955 | Roach | 219/130 X |
| 2,898,516 | 8/1959 | Volff | 219/131 X |
| 2,516,016 | 7/1950 | Pakala | 219/131 |
| 2,516,037 | 7/1950 | Williams | 219/131 |
| 2,532,807 | 12/1950 | Girard et al | 219/131 X |
| 2,574,514 | 11/1951 | Volff et al | 219/131 X |
| 2,612,582 | 10/1951 | Appleton | 219/131 |
| 2,620,422 | 12/1952 | Volff | 219/130 |
| 2,634,355 | 4/1953 | Girard | 219/131 |
| 3,178,555 | 4/1965 | Foote | 219/131 |
| 3,271,620 | 9/1966 | Webb | 315/171 X |

OTHER PUBLICATIONS

" Electronic Circuit Analysis" AF Manual 52–8 Volume II pages 10–19 to 10–20.

*Primary Examiner*—J. V. Truhe
*Assistant Examiner*—George A. Montanye
*Attorney*—Frank R. Trifari

[57] ABSTRACT

The invention relates to a gas-shielded arc-welding system in which the welding arc is struck and/or stabilized by a high-frequency discharge which takes place between a welding electrode and the workpiece. The matching of the high-frequency voltage source to the high-frequency discharge is improved and the welding torch is simplified by using a first coaxial cable of a length equal to a quarter wavelength of the high-frequency voltage and a second coaxial cable connected to a point of the first coaxial cable in a manner such that the sum of the lengths of the two cables up to the welding electrode is equal to one half wavelength of the high-frequency voltage or to an integral multiple thereof.

10 Claims, 2 Drawing Figures

GAS-SHIELDED ARC-WELDING SYSTEM

The invention relates to a gas-shielded arc-welding system in which the welding arc is struck and/or stabilized by a high-frequency discharge which takes place between a welding electrode and the workpiece, which system comprises a source of welding current, a source of high-frequency voltage, a source of a shielding gas and a welding torch having a holder for a welding electrode, a passage for the stream of shielding gas having an orifice surrounding the electrode, and a device for ionizing the shielding gas issuing from this passage.

Such systems are known, for example, from copending German Pat. specification No. 1,131,342 and from British Pat. specification No. 695,077.

It is an object of the invention to improve the matching of the high-frequency voltage source to the high-frequency discharge and to simplify the construction of the welding torch.

For this purpose a system according to the invention is characterized in that it comprises a first coaxial cable having a length equal to one quarter wave-length of the high-frequency voltage and constituted by a first conductor the ends of which are connected to the welding electrode and to a terminal of the source of welding current, respectively, and by a second conductor connected to a terminal of the source of high-frequency voltage, and a second coaxial cable having an inner conductor the ends of which are connected to the other terminal of the source of high-frequency voltage and to a point on the first conductor near that end thereof which is more remote from the welding electrode, respectively, and an outer conductor connected to the second conductor and to the first-mentioned terminal of the source of high-frequency voltage. The sum of the lengths of the second coaxial cable and of that part of the first coaxial cable which is situated between the point at which the second coaxial cable is connected to it and the welding electrode is equal to one half wavelength of the high-frequency voltage or to an integral multiple thereof.

Figure 2:
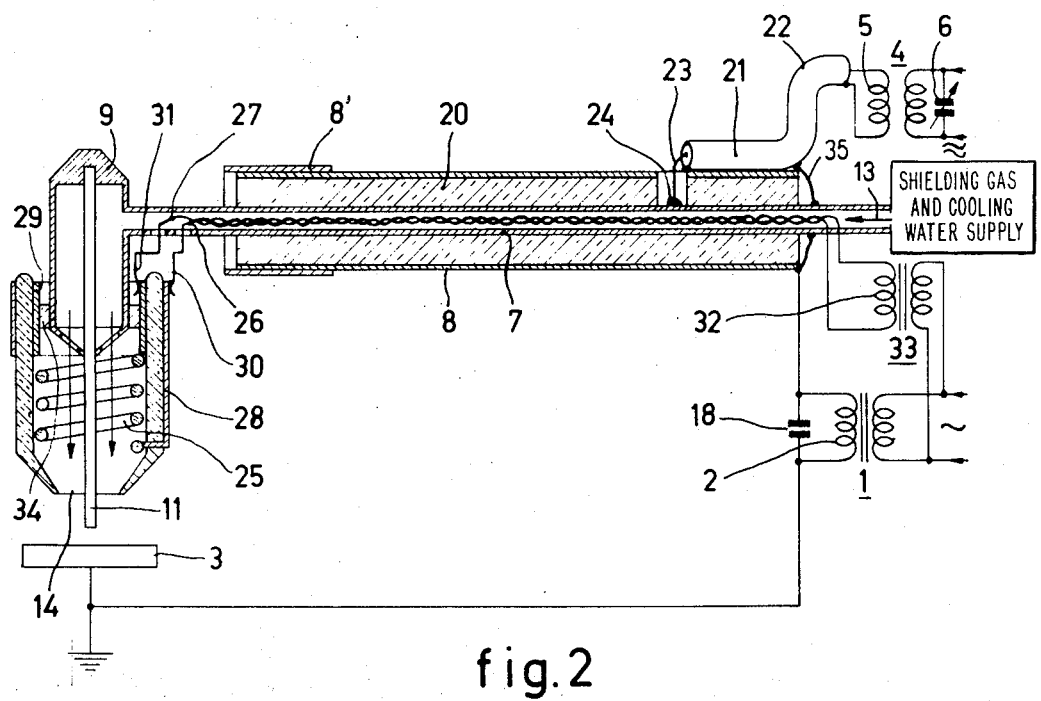

Embodiments of the invention will now be described, by way of example, with reference to the accompanying diagrammatic drawings, in which:

FIG. 1 shows schematically a first embodiment of a system according to the invention, and FIG. 2 shows a second embodiment thereof.

The system shown in FIG. 1 is suitable for gas-shielded arc-welding, the arc being struck and/or stabilized by a high-frequency discharge which takes place between a welding electrode 11 and a workpiece 3. In the proximity of the welding electrode 11 an auxiliary discharge is maintained by means of which the shielding gas, which issues around the welding electrode is ionized so that the above-mentioned high-frequency discharge is struck even with a comparatively large spacing between the welding electrode 11 and the workpiece 3 and at a comparatively low high-frequency voltage.

The system includes a source of welding current shown in the form of a supply transformer 1 having a secondary winding 2, a source of high-frequency voltage shown in the form of a high-frequency transformer 4 having a secondary winding 5, a source of shielding gas indicated by a supply pipe 13, a holder 9 for the welding electrode 11, a passage 14 for the stream of shielding gas having an orifice surrounding the electrode, and a device for ionizing the shielding gas issuing from this passage.

The latter device comprises an auxiliary electrode 15 which is arranged so as to extend towards a periphery of the welding electrode 11 remote from the end thereof in a manner such that in operation the stream of shielding gas flows through the gap between the auxiliary electrode 15 and the said periphery of the welding electrode 11, and an auxiliary high-voltage source 16 connected to the auxiliary electrode 15 through a series resistor 17 of, for example, 1 M $\Omega$ which is arranged in the welding torch and serves to prevent the occurrence of relaxation oscillations. The auxiliary high-voltage source 16 may take the form of an anode-voltage source of, say, + 2 kV for the output stage of the high-frequency voltage source. The other terminal of the high voltage source, not shown, may be connected to ground.

According to the present invention the source of high-frequency voltage is matched to the high-frequency discharge by a first coaxial cable 20 having a length equal to one quarter wavelength ($\lambda/4$) of the high-frequency voltage and comprising a first conductor 7 which may have the form of an at least partly flexible hollow cylinder, the ends of which are connected to the welding electrode 11 and to a terminal of the source 1, 2 of welding current, respectively, and a second outer conductor 8 connected to a terminal of the source of high-frequency voltage and electrically short-circuited to the conductor 7 at the left hand or input end thereof, and by a second coaxial cable 21 having an inner conductor 23 the ends of which are connected to the other (upper) terminal of the source 4, 5 of high-frequency voltage and to a point 24 on the first conductor 7 of the first coaxial cable 20 near that end thereof which is more remote from the welding electrode 11, and an outer conductor 22 connected to the second conductor 8 and to the first-mentioned terminal of the source of high-frequency voltage. The length of the second coaxial cable 21 is chosen so that the sum of the lengths of this cable and of that part of the first coaxial cable 20 which is situated between the point 24 (at which the inner conductor 23 of the second coaxial cable 21 is connected thereto) and the welding electrode 11 is equal to one half wavelength ($\lambda/2$) of the high-frequency voltage or to an integral multiple thereof ($n\lambda/2$).

In operation the high-frequency voltage applied between the point 24 of the first conductor 7 and the second conductor 8 is greatly stepped up by the first coaxial cable 20 of length $\lambda/4$ so that the high-frequency discharge between the welding electrode 11 and the workpiece 3 will readily and immediately be struck by the discharge between the auxiliary electrode 15 and the welding electrode 11. The current path for the latter discharge extends from terminal 16 through resistor 17, electrodes 15 and 11, inner coax conductor 7, secondary winding 2 and then to ground. However, as soon as the high-frequency discharge, which takes place in the stream of shielding gas, has been struck it forms substantially a short circuit between the conductors 7 and 8 of the right-hand end of the coaxial cable 20. The transformer 4 and the coax cables 21 and 20 together constitute a complete high frequency wave guide system with an open end to which the holder 9 is connected. This system is grounded to the welding apparatus by means of capacitor 18 so that the outer coax conductors 22 and 8 are also grounded. A high frequency discharge will take place, assuming the voltage is high enough, between the holder 9 connected to one side of the high frequency system (conductor 7) and the other side thereof, i.e., conductor 8. However, the space between these sides is sufficiently large to prevent a discharge therebetween and so this discharge will take place between the electrode 11 and the workpiece 3 since the latter is connected to ground and thence via capacitor 18 and conductor 22 to conductor 8 (and the other side of the high frequency source 4). Since the length of the second coaxial cable 21 together with that part of the first coaxial cable 20 which is situated between the point 24 and the welding electrode 11 is equal to $\lambda/2$ or to $n \lambda/2$, the source 4, 5 together with the cables 20 and 21 acts as a current source and delivers a large high-frequency current so that the welding arc is efficiently struck and stabilized by the discharge with a large high-frequency current.

With the proposed arrangement of the coaxial cables 20 and 21 no high-frequency field is generated in the space within the first conductor 7 of the cable 20 so that this space can be used for supplying water and shielding gas from the supply 13 for cooling the first conductor 7 which supplies the welding current from the source 1, 2 to the welding electrode 11, and also for accommodating a lead connecting the auxiliary electrode 15 to the auxiliary high-voltage source 16. Thus, the $\lambda/4$ high-frequency transformer is not damped by the shielding gas and/or the cooling water and auxiliary high-voltage leads and connections because they are located outside the high-frequency field and hence cannot cause high-frequency losses.

In the second embodiment shown in FIG. 2 the ionizing device comprises a filament 25 accommodated in the space between the passage 14 and the welding electrode 11 and two electrically conducting connections for supplying heating current to this filament. As the figure shows, each of these conductive connections comprises an insulated wire 26 and 27 which are partly accommodated in the hollow first conductor 7 of a first coaxial cable 20 and are connected to contact springs 30 and 31, respectively. The contact spring 30 slides on the outer surface of a copper tube 28 pressed around the end of the passage 14, which passage is made of an insulating ceramic material, and the contact spring 31 slides on the inner surface of a copper tube 29 pressed into the same end of the passage 14. The filament 25 is wound so as to be coaxial with the welding electrode 11 and its ends are rigidly secured to the copper tubes 28 and 29. The passage 14 together with the tubes 28 and 29 and the filament 25 is pressed around an insulating ceramic ring 34 which encircles the electrode holder 9.

At the end of the first coaxial cable 20 remote from the welding torch (input end) the conductors 26 and 27 pass through the wall of the supply pipe 13 for shielding gas, and the brought-out ends are connected to the ends of a secondary 32 of a second supply transformer 33. By this transformer the circuit of the filament 25 is isolated from the welding circuit 3, 2, 7, 9, 11, from the high-frequency discharge circuit 3, 18, 8, 7, 9, 11 and from the high-frequency supply circuit 22, 5, 23. The input end of the conductor 8 is connected to the input end of the conductor 7 by means of one or more electrical leads 35.

The first coaxial cable 20 can be accurately tuned to a quarter wavelength by varying the capacitance between the conductors 7 and 8, for example, by shifting a sleeve-shaped element 8' surrounding the second conductor 8, correct tuning being indicated by the maximum length of the high-frequency discharge arc.

In operation the filament 25 is brought to incandescence in the shielding-gas atmosphere by the supply frequency alternating current supplied to it from the transformer 33 through the conductors 26 and 27 so that thermal emission takes place. The shielding gas issuing between the welding electrode 11 and the passage 14 is ionized by the electrons emitted by the filament 25. As a result, the high-frequency voltage which is stepped up by the first coaxial cable 20 and is applied to the welding electrode 11 will cause a high-frequency discharge arc to be struck even in the case of a comparatively large spacing (of several centimeters) between the welding electrode 11 and the workpiece 3. The high-frequency current in this arc rapidly decreases to a value of several, for example 10, amperes, whereupon the low-frequency welding arc proper is struck. In contrast to FIG. 1, the ground connection of the high frequency system has been removed from the coax cable 21 and directly coupled to conductor 8 via capacitor 18.

In the embodiments described the coaxial cables 20 and 21 form a high-frequency voltage transformer having a maximum secondary short-circuit current. This transformer considerably increases the efficiency of a given source of high-frequency voltage and hence enables good, reliable and uniform welding results to be obtained by means of a high-frequency voltage source of comparatively low power: it increases the overall efficiency of the system while reducing its price. A further increase of the overall efficiency and/or a reduction of the power of the high-frequency voltage source is obtainable in a manner known, for example, from U.S. Pat. No. 2,745,990 by designing this source so as to produce short high-frequency voltage pulses synchronized with the supply voltage which occur a short time after each passage through zero, for example, towards the positive polarity, of the low-frequency alternating voltage between the welding electrode 11 and the workpiece 3.

The embodiment shown in FIG. 2 also gives good results. This proves that the welding electrode 11 itself need not be made thermally emissive for the high-frequency discharge and the welding arc between the welding electrode and a workpiece to be struck and/or stabilized, but that it is sufficient to dispose a thermally emissive element in the proximity of this electrode in the stream of shielding gas, which element need not contact the electrode. It has further been found that such a contact is even undesirable because, when the filament 25 is in contact with the welding electrode 11, under certain conditions the high-frequency discharge will be struck from the hot filament 25 so that a welding arc is also struck between the filament and the workpiece 3 with the result that the filament burns out.

The power required to raise the filament 25 to a sufficiently high temperature is of the order of 20 Watts (for example, 5 volts and 4 amperes) and hence of the same order as the direct-current power (of, for example, 2,000 volts and a few milliamperes) supplied to the auxiliary electrode 15 of the embodiment shown in FIG. 1. Provided that the filament is made of a material which evaporates only at a very high temperature, for example, tungsten, there will be no contamination of the shielding gas and/or the weld.

What is claimed is:

1. A gas-shielded arc-welding system for a workpiece in which a welding arc is struck and/or stabilized by means of a high-frequency discharge comprising a welding electrode, a source of welding current, a source of high-frequency voltage, a source of shielding gas, a welding torch having a holder in which said welding electrode is mounted, means defining a channel for a stream of shielding gas and having an orifice which surrounds said electrode, means coupling said gas source to said channel, a device located near said electrode for ionizing the shielding gas issuing from said channel, a first coaxial cable having a length equal to a quarter wavelength of the high-frequency voltage comprising a first conductor having one end connected to the welding electrode and the other end to a terminal of the source of welding current and a second conductor, a second coaxial cable having an inner conductor with one end connected to a first terminal of the source of high-frequency voltage and the other end connected to a junction point on the first conductor near that end thereof which is remote from the welding electrode, said second coaxial cable having an outer conductor connected at one end to the second conductor of the first coaxial cable and at the other end to the other terminal of the source of high-frequency voltage, the sum of the lengths of the second coaxial cable and of the part of the first coaxial cable situated between the junction point and the welding electrode being equal to one half wavelength of the high-frequency voltage or to an integral multiple thereof, means electrically connecting the first and second conductors of the first coaxial cable together at the ends thereof closest to the current source connection to provide a short circuit thereat, and means adapted to connect the other terminal of the welding current source to the workpiece.

2. A system as claimed in claim 1 wherein said first conductor comprises a hollow tube coaxially mounted within the second conductor and the ionizing device comprises a heater filament arranged in the gas channel and coaxially surrounding a part of the welding electrode, and a pair of insulated leads located within said first conductor and connected to said filament for supplying heater current thereto.

3. A system as claimed in claim 1 wherein the second conductor extends to a point near the welding electrode and which is left unconnected and wherein the second conductor includes an axially moveable rigid portion located at the end thereof adjacent the welding electrode, the length of the second conductor being adjustable by axially shifting said rigid portion thereof.

4. A system as claimed in claim 1 wherein the gas coupling means comprises a supply pipe and the first conductor comprises a partially flexible hollow cylinder in which are accommodated the gas supply pipe and at least one conductive connection to the ionizing device.

5. A system as claimed in claim 4 wherein the ionizing device comprises a heater filament arranged in the gas channel and adjacent the welding electrode, and means for accommodating two conductive connections for supplying a heating current to said filament in an insulated manner within the first conductor so that the electric circuits of the welding electrode and of the filament are isolated from one another.

6. A system as claimed in claim 4 further comprising means within said first conductor for water cooling the first conductor.

7. An arc welding system for a workpiece comprising, a channel member with an opening at one end for a shielding gas, a welding electrode mounted within the channel member with one end projecting from said opening, a source of welding current, a source of high frequency energy, means for introducing a shielding gas into the channel member and out through said opening, means located near the welding electrode for ionizing the gas passing through said channel opening, a first quarter wave coaxial cable having an inner conductor and an outer conductor, the inner conductor having an input end connected to a terminal of the welding current source and a load end connected to the welding electrode, a second coaxial cable having an inner conductor with one end connected to a first terminal of the high frequency energy source and the other end connected to a junction point on the first cable inner conductor near the input end, said second cable also having an outer conductor with one end connected to the second terminal of the high frequency energy source and the other end connected to the input end of the outer conductor of the first cable, the length of the second coaxial cable plus that part of the first coaxial cable located between the junction point and the welding electrode being equal to one half wavelength of the high frequency energy or to an integral multiple thereof, means for connecting another terminal of the welding current source to the workpiece, and means for short circuiting together the input ends of the inner and outer conductors of the first coaxial cable.

8. A welding system as claimed in claim 7 wherein the inner conductor of the first coaxial cable comprises a hollow tube with an inlet opening for the shielding gas and an outlet opening coupled to the channel member, and an electric lead located within said tube with one end connected to the gas ionizing means and the other end connected to a source of high voltage.

9. A welding system as claimed in claim 7 wherein said gas ionizing means comprises a heater filament within said channel and coaxially surrounding a part of said welding electrode and the inner conductor of the first coaxial cable comprises a hollow tube, and a pair of leads located within said tube and connected to said filament and to a source of heater current for the filament.

10. A welding system as claimed in claim 9 wherein said means for introducing the shielding gas into the channel member includes said hollow tube.

* * * * *